United States Patent [19]

Hooke et al.

[11] 4,271,241

[45] Jun. 2, 1981

[54] RESEALABLE VENT VALVE FOR CONTAINERS SUCH AS BATTERIES

[75] Inventors: John W. Hooke, Gainesville; Paul E. Pate, Branford, both of Fla.

[73] Assignee: General Electric Company, Gainesville, Fla.

[21] Appl. No.: 118,767

[22] Filed: Feb. 5, 1980

[51] Int. Cl.³ .............................................. H01M 2/12
[52] U.S. Cl. ..................................................... 429/54
[58] Field of Search ............... 429/54, 55, 53; 215/17, 215/18, 311

[56] References Cited

U.S. PATENT DOCUMENTS

| | | | |
|---|---|---|---|
| 3,096,216 | 7/1963 | Warren | 429/54 |
| 3,484,301 | 12/1969 | Gray | 429/54 |
| 3,664,878 | 5/1972 | Amthor | 429/54 |

*Primary Examiner*—Charles F. LeFevour
*Attorney, Agent, or Firm*—Morgan, Finnegan, Pine, Foley & Lee

[57] ABSTRACT

This invention pertains to a novel resealable pressure relief vent valve for use in normally sealed containers such as sealed electric batteries or cells wherein said vent valve includes an outer rigid plate, an inner flexible disc forming part of the interior of the container, said disc having one or more vent holes and a compressible rubber disc positioned in partially compressed condition between the outer rigid plate and inner flexible disc and situated over each of said vent holes whereby the inner flexible disc flexes upward breaking its seal over the said holes venting the interior of the container when excessive internal pressures occur.

10 Claims, 4 Drawing Figures

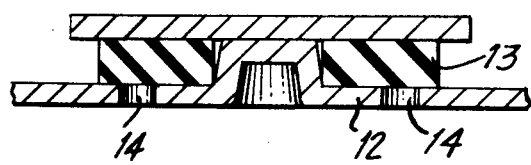
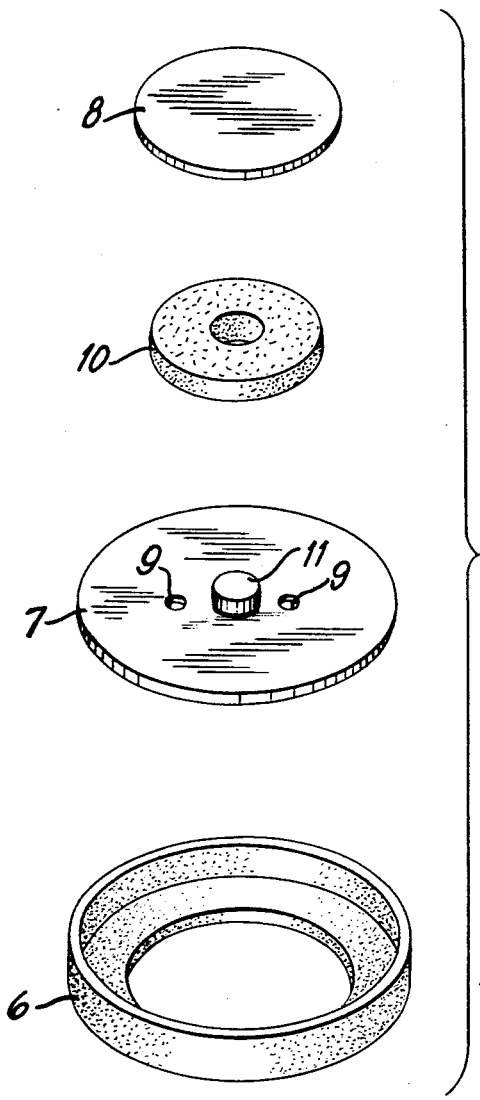
FIG. 3
FIG. 4

RESEALABLE VENT VALVE FOR CONTAINERS SUCH AS BATTERIES

BACKGROUND OF THE INVENTION

1. Field of the Invention

This invention pertains to a novel resealable pressure relief vent valve which can be used in containers which are air and fluid tight. More particularly, the present invention relates to an improved resealable pressure relief vent valve which is capable of relieving the build-up of excessive gas pressures within a closed container such as an energy cell. When said pressure is relieved, the vent closes providing the cell with its air and fluid-tight configuration.

The valves of the present invention have particular application in containers such as electrical batteries or cells which are inexpensive yet which must be provided with a reliable valve which has good endurance to function the entire life of the battery or cell. Therefore, the valves of the present invention are particularly characterized by their relative inexpensive cost of manufacture, simplicity of design and reliability.

The term battery is generally used to describe a single unit comprising one or more cells which supply electrical energy. The electric current is produced directly by chemical reaction which occurs within the battery. The terms battery and cells will be used hereinafter interchangeably.

The resealable vent devices of the present invention are useful in sealed cells in contrast to vented cells. A sealed cell, in its normal operation, does not require the venting of gas to the atmosphere. However, in a vented cell, venting is part of the normal operating behavior of the cell. Although sealed cells contain a vent mechanism, they are still referred to as "sealed" cells because the vent operates only as a safety measure when, as a result of a malfunction or an abuse of the cell, the cell obtains an abnormally high internal pressure.

In a sealed cell, the safety vent mechanism is designed to open if the pressure exceeds a certain limit. After the vent releases the excess pressure to the atmosphere, it automatically closes, sealing the cell. For this reason, it is called a resealable safety vent. The vent is incorporated in the cell or battery to protect the cell by opening to relieve damaging high pressure, and resealing the cell so that it does not remain open to the atmosphere and cause the electrolite to dry out.

The vent devices of the present invention have a resealing capability. Resealable safety vents are generally preferred to non-resealable vents in sealed cells for various reasons. Resealable vents can be tested prior to assembly into a cell casement to help assure reliable operation. The resealing feature allows the cell to operate after the excess pressure has been relieved. Cells containing a non-resealable vent will not function properly after venting because the electrolite within the cell will dry out as the vent remains open.

While the resealable safety vents of the present invention may be utilized on most sealed cells which potentially could experience increases in internal pressure, nickel-cadmium cells are discussed in greatest detail herein. Such cells are merely illustrative and examples of other cells that may be used include carbon-zinc dry cells and "alkaline" cells. The operating pressures for each of these cells and other cells vary from those of nickel-cadmium cells and the resealable vent devices of the present invention may be suitably adapted to be used at pressures other than those in nickel-cadmium cells.

As used herein, the term vent pressure means that internal pressure that will cause the vent in the cell to open.

2. Description of the Prior Art

Resealable pressure relief vent valves of various designs have been used in the past for releasing high internal gas pressures from the inside of a sealed electrical cell or battery such as a nickel-cadmium cell. These valves generally utilize a valve member such as a flat rubber gasket which is situated in a sealing position over a vent orifice by means of a resilient member such as a helical spring. The resilient member or spring is set to yield at a certain predetermined internal gas pressure which momentarily breaks the seal and allows the gas to escape through the vent orifice. Examples of such pressure relief vent valves are described in U.S. Pat. No. 3,664,878 in the name of H. K. Amthor; U.S. Pat. No. 3,484,301 in the name of E. E. Gray; and U.S. Pat. No. 3,293,091 in the name of J. L. S. Daley. All of these patents disclose devices whose configuration require critical tolerances to enable the valve system to function properly. As brought out in U.S. Pat. No. 3,644,878, a major problem encountered with such valves is that they are bulky and difficult to incorporate into the cell assembly.

Conventional devices utilizing metal springs are extremely costly and require very close tolerances to attain the desired force exerted by the springs. Moreover, the labor costs in fixing the springs in the cell is substantial. The vent device of the present invention has none of these disadvantages attributed to spring-type vents.

Another advantage of the vent device of the present invention over the conventional spring vent devices is that it requires substantially less space, particularly for its height, in the cell. The reduction in height is attributed to the elimination of the spring component in the vent device of the present invention. By reducing the space required for the vent section, a battery containing the vent device of the present invention can contain more energy-producing materials yielding a battery having an increase in energy density over a comparable cell utilizing conventional vent devices.

The resealable vent device of the present invention overcomes these and other problems and provides numerous additional advantages over known resealable pressure relief valves.

BRIEF DESCRIPTION OF THE DRAWINGS

FIG. 3 is an exploded perspective view of the resealable vent valve of the present invention.

FIG. 4 is an enlarged, cross-section of a postion of the resealable vent valve in the sealed configuration in accordance with the present invention.

SUMMARY OF THE INVENTION

According to the present invention, there is provided a resealable pressure relief valve capable of relieving the excessive build-up of internal pressure within a closed container by venting gas from the container to the atmosphere and resealing the cell after the internal pressure is sufficiently reduced, said valve comprising:

an outer rigid plate;

an inner flexible disc forming part of the interior of the container and which contains one or more vent holes; and a compressible rubber gasket situated in partially compressed condition between the outer plate and inner disc and over the said vent holes;

wherein said plate is bound to the inner disc by means passing through an open area of the gasket interconnecting the upper surface of the inner disc and the lower surface of the outer plate; and wherein said valve vents gas when a predetermined internal pressure is reached within the container, which pressure causes the inner disc to flex upward yielding a non-uniform gap between the surfaces of the inner disc and rigid plate transmitting a non-uniform compression to the rubber gasket including reduced compression of the gasket in the area adjacent said vent holes causing the gasket to break its seal over the vent holes providing a vent path for the venting gas.

DESCRIPTION OF THE PREFERRED EMBODIMENTS

The Drawings

Figure 1:
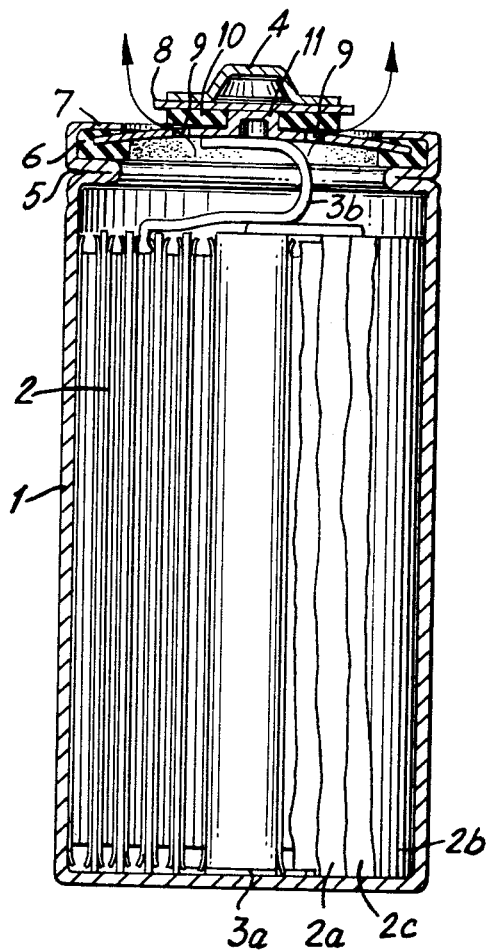
FIG. 1 is a fragmentary cross-sectional view of the resealable vent valve of the present invention in an energy cell where the valve is in a venting condition.
Figure 2:
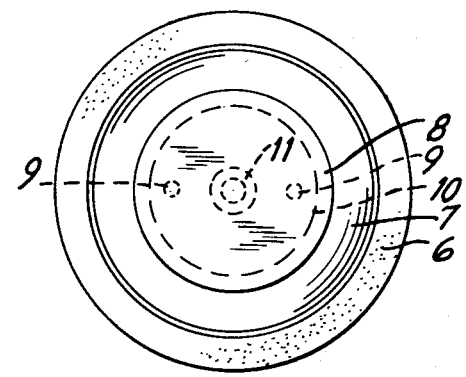
FIG. 2 is a top view of the resealable vent valve in the energy cell of FIG. 1.

FIGS. 1 and 2 illustrate the cross-section and top views of a battery incorporating a resealable vent valve of the present invention. The battery comprises a nickel-plated steel can or casing 1 in which is contained a battery coil 2 which consists of a positive plate 2a and a negative plate 2b separated by separator insulative layers 2c which are wound together to form the battery coil 2. A tab 3a connected to or integral with the negative plate 2b is secured to the bottom of the casing 1. Another tab or strap 3b connected to or integral with the positive plate 2a is secured to a positive terminal located in an electrically conductive button 4 which is welded to the top surface of the rigid metal plate.

The upper end of the battery is formed by the can 1 being bent forming a groove 5 and rolled or further bent over an insulating seal ring 6 and inner metal disc 7 providing a crimp closure.

The resealable safety vent device of the present invention comprises an outer rigid metal plate 8, an inner flexible metal disc 7 containing vent holes 9, and a rubber gasket 10 sandwiched between the outer rigid plate and inner flexible disc.

In the embodiment shown in FIGS. 1-4, a dimple or boss 11 in the upper surface of the inner flexible disc 7 protrudes upward through an open area in the center of the gasket 10 and that dimple is bonded to the bottom surface of the rigid plate 8. In another embodiment (not shown), the dimple or boss is located in the bottom surface of the metal plate cover and projects downward through the gasket opening to be bonded to the flexible metal disc. The height of the dimple or boss is chosen so as to cause the sandwiched gasket to attain the desirable compression as will be discussed more fully below.

In FIG. 1 the vent device is in the venting condition as would occur if the internal pressure exceeded a predetermined set limit. The path of the gas escaping through the vent holes 9 is shown by the arrow. The inner metal disc 7 is flexing upward as a result of the excessive internal pressure of the battery while the dimple 11 and the outer metal plate 8 remain rigid. The change in the plane of the inner disc 7 with respect to the plane of the rigid plate 8 causes a non-uniform gap between the surfaces and a non-uniform compression on the rubber gasket 10. When the vent pressure is reached, the compression on the rubber gasket 10 is sufficiently reduced in the area near the vent holes 9 to cause a break in the seal between the rubber gasket and the inner metal disc yielding a vent path outward from the inner container of the cell.

After the internal pressure of the cell is reduced below the vent pressure, the inner disc returns to its flat configuration, thus resealing the vent holes in the inner metal disc.

In the enlarged cross-section view in FIG. 4 the vent is shown in a sealed condition where the flexible inner disc 12 is flat causing the rubber gasket 13 in its compressed condition to cover and seal the vent holes 14.

The Vent Device And Its Operation

The resealable vent device of the present invention, when incorporated in a sealed nickel-cadmium cell, is designed to open in the pressure range of about 100 to 400 psig. The lower value for the range is determined by the minimum optimum pressure required to carry out the electrochemical reaction in the cell. The upper value for the range is determined by the maximum internal pressure at which the cell's container will safely maintain its integrity.

The rubber gasket which is sandwiched between the rigid metal plate cover and flexible internal metal disc is actually the sealing member which covers the vent holes in the internal disc. Therefore, the material of the gasket must not be porous to the gases generated within the cell or to the atmosphere. The gasket must have memory characteristics. When its compression is reduced as the inner disc flexes under excess internal pressure, its seal over the vent holes will be broken. As the disc returns to its flat configuration when the internal pressure is within prescribed safe limits, the gasket returns to its originally compressed state forming the seal with the inner disc over the vent holes. The gasket material must also be resistant to caustics and other chemicals within the cell. An example of a suitable material for the gasket would be an ethylene-propylene rubber.

The inner flexible disc in combination with the rubber gasket seals the upper end of the cell or battery. The crimped closure for the top of the cell is formed around the edges of the inner flexible disc by causing a seal ring of a flexible and non-porous material to be sandwiched between the edge of the inner flexible disc and the rolled edges of the can. Because the inner disc forms a substantial portion of the top cover of the cell, it must be sufficiently strong to withstand the internal pressures within the cell below the vent pressure and be resistant to normal physical abrasion on the external surface.

The inner disc may be composed of a nickel plated steel which has sufficient flexibility and memory or temper to function properly in the vent of the present invention. By having memory or temper is meant that the steel should have minimum hysterisis and be capable of flexing at the vent pressure to a sufficient degree and distance to reduce the compression on the rubber gasket and form a vent path from the vent hole in the inner disc to the atmosphere. The resealable safety vent of the present invention should preferably vent with a deflection of the inner disc in the order of about 0.020 inches. Therefore, the degree of flexing of the inner disc should be determined by reverse engineering utilizing the desired vent pressure and size of disc.

The internal pressure at which a vent path will be formed from the vent holes in the inner disc to the outside will depend upon a number of variables in the components of the vent device. Most significant of these variables are the durometer of the gasket, the degree of compression of the gasket, the dimple height, the flexibility of the inner disc, the diameter of the vent hole, and the location and number of the vent hole with respect to the center of the inner flexible disc. While there appear to be a large number of variables, once the vent pressure for a given size battery is chosen, and the materials to be used in the vent device are chosen, the actual structure and dimensions of the vent components can be determined.

In the approximate center of the inner disc is located a dimple or boss. The upper surface of this boss is utilized to bond or adhere to the outer rigid metal cover. The dimple or boss must have a sufficient cross-section to be able to be bonded or welded to the rigid metal plate. The height of the dimple above the surface of the flexible disc determines the degree of compression for a given rubber gasket.

The degree of compression for the rubber gasket should be sufficient to cause a force downward onto the surface of the inner disc which exceeds the force exerted by the normal operating pressure of the cell but which is less than the force exerted by the internal pressure when it exceeds the vent pressure. It is preferred to choose a rubber gasket having a durometer whereby the desired degree of compression is achieved with a 20% or less compression or reduction in the thickness of the gasket. The greater the degree of compression, the greater the distance the inner disc must flex in order to reduce the compression. For a large diameter disc, a more highly compressed gasket may be used than for a smaller diameter disc. In general, there is an advantage to use as high a compression of the disc as possible. As the degree of compression for the gasket increases, the criticality for the assembly parts is reduced because the same tolerance of error for a part will have a smaller effect on larger degrees of compression.

The actual dimensions of the gasket must be considered both in the compressed and uncompressed state. As described above, the gasket is of a donut shape. The inner diameter of the donut must be sufficiently small to cover the vent holes in the inner flexible disc. If the inside diameter of the gasket becomes too close to the vent holes, small increases in internal gas pressure can expand or distort the inside diameter causing a relocation of the gasket, causing the internal gas to act on the gasket in different directions. On the other hand, the inside diameter of the gasket must be sufficiently large so as to fit around the dimple or boss in the inner flexible disc without sliding out of position.

As a general rule, the closer the vent holes in the flexible disc are to the center line of the disc, the greater the flexing angle required for the disc in order to form a vent path. Hence, as the vent holes are moved closer to the outside diameter of the flexible disc, the angle of flexing is reduced for forming a vent path. As a matter of practicality, the smaller the diameter of the overall cell, the closer the vent hole must be to the center line of the cell. Therefore, depending upon the materials chosen for the venting device, there may be a minimum diameter for cells which may use the vent device of the present invention. For most materials used for the vent device of the present invention, it is recommended that cells should have a minimum diameter of about 0.875 inches. This would be equivalent to a sub-size C cell or larger.

A diameter of the vent holes themselves are also an important factor in determining the number of holes that should be present in the disc as well as their location. It is suggested that vent holes have a diameter in the range of 0.080–0.090 inches. The border around a vent hole formed by the rubber gasket should be about 0.030–0.040 inches to assure proper sealing of the vent hole.

The rigid metal plate of the vent device an be comprised of any durable metal such as a nickel-plated steel. It must be rigid and flat and have a surface which is compatible for welding or bonding to the inner flexible disc. The rigid metal cover may have a diameter less than that of the inner metal disc, as small as one-half the diameter of the inner disc.

The top or cover of the cell must contain the positive terminal which is electrically connected to the positive plate. The upper rigid plate of the vent device may also function as the cover of the cell. Optionally, a high hat or electrically conductive button can be welded to the outer surface of the metal plate to form a positive terminal for the cell. The strap or tab connected to the positive plate can be welded to the bottom surface of the inner flexible disc which is electrically connected to the upper rigid plate by the attachment through the boss or dimple.

This configuration represents an important advantage of the vent device of the present invention over conventional devices. Due to the spring vent designs in conventional cells, a metal strap from the roll assembly (positive plate) must be bonded to a non-uniform, non-flat surface on the underside of the cover. Due to this non-uniform, non-flat surface, the target area for welding the strap is small and therefore the labor costs involved in attaining the weld in conventional valves are high. In the design of the valve of the instant invention, the surface of the inner disc is flat, significantly reducing the cost and difficulty in welding the strap.

The pressure relief valve of the present invention provides a significant savings in manufacturing costs compared with helical-spring type valves used in conventional energy cells, with no sacrifice in reliability. The valve of the present invention provides a significant saving in assembly costs because there is minimal labor required in the orientation of parts for the valve providing for automatic assembly thereof. Compared with conventional spring-type valves, the valve of the present invention provides not only a saving in manufacturing and assembly costs but it also has a smaller space requirement in the cell. Cells containing the valve of the present invention can be improved by utilizing the additional space attributed to the more streamline valve.

What is claimed is:

1. A resealable pressure relief valve capable of relieving the excessive build-up of internal pressure within the closed container of an energy cell by venting gas from within the container to the atmosphere and resealing the container after venting, said valve comprising:
  an outer rigid plate;
  an inner flexible disc forming part of the interior of the container which contains one or more vent holes;

a compressible rubber gasket positioned in partially compressed condition between the outer rigid plate and the inner flexible disc and situated over each of said vent holes;

wherein said outer plate is bound to the inner disc by means passing through an open area of the gasket interconnecting the upper surface of the inner disc and the lower surface of the outer plate; and wherein said valve is capable of venting gas when the internal pressure of the container exceeds a predetermined limit which excessive pressure causes the inner disc to flex upward yielding a non-uniform gap between the surfaces of the inner disc and outer plate transmitting a non-uniform compression to the rubber gasket including reduced compression of the gasket in the area of said vent holes causing the gasket to break its seal over the vent holes providing a vent path for the venting of gas from the container.

2. The valve of claim 1 wherein the outer plate is bonded to the inner disc by means of a boss in the upper surface of the inner flexible disc which protrudes upward through an open area in the gasket and which is bonded to the bottom surface of the outer plate.

3. The valve of claim 1 wherein the resealable vent opens for venting internal gas at an internal pressure in excess of the minimum operating pressure for the energy cell and below the maximum pressure for maintaining the integrity and safety of the cell's container.

4. The valve of claim 1 wherein the gasket is of an ethylene-propylene rubber.

5. The valve of claim 1 wherein the inner disc during the venting operation of the valve deflects from the unflexed flat position by an amount in the order of about 0.020 inches as measured along the center axis of the inner disc.

6. The valve of claim 1 wherein the gasket, when positioned in said valve under normal operating conditions, is compressed to a degree whereby its compressed thickness or height is equal to or less than a 20% reduction in the thickness of the uncompressed gasket.

7. The valve of claim 1 wherein each of the vent holes in said inner flexible disc have a diameter in the range of 0.08–0.09 inches.

8. The valve of claim 1 wherein the rubber gasket when sealing the vent holes forms a border of 0.03–0.04 inches around each vent hole.

9. The valve of claim 1 which is capable of venting gases from within the cell container when an internal pressure of the cell exceeds 100 psig.

10. In a method for venting a sealed energy cell when the internal pressure of the cell exceeds a predetermined maximum value, and for resealing the cell after the internal pressure falls below said maximum value, the improvement which comprises incorporating in said energy cell the resealable pressure relief valve of claim 1.

* * * * *